(12) United States Patent
Obara (10) Patent No.: US 11,172,084 B2
(45) Date of Patent: Nov. 9, 2021

(54) PREVIEW IMAGE DISPLAY APPARATUS AND STORAGE MEDIUM

(71) Applicant: KYOCERA Document Solutions Inc., Osaka (JP)

(72) Inventor: Shuhei Obara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/509,106

(22) Filed: Jul. 11, 2019

(65) Prior Publication Data

US 2020/0021699 A1    Jan. 16, 2020

(30) Foreign Application Priority Data

Jul. 12, 2018 (JP) .............................. JP2018-132275

(51) Int. Cl.
*H04N 1/00* (2006.01)
*G06F 3/12* (2006.01)

(52) U.S. Cl.
CPC ....... *H04N 1/00453* (2013.01); *G06F 3/1256* (2013.01); *H04N 1/00411* (2013.01); *H04N 1/00506* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,601,003 A | * | 7/1986 | Yoneyama | G06F 16/40 715/775 |
| 4,780,712 A | * | 10/1988 | Itaya | G01R 13/00 345/534 |
| 10,564,907 B2 | * | 2/2020 | Hasegawa | H04N 1/00482 |
| 2005/0120306 A1 | * | 6/2005 | Klassen | G06F 3/0482 715/765 |
| 2006/0098111 A1 | * | 5/2006 | Goh | H04N 5/23293 348/333.05 |
| 2006/0112352 A1 | * | 5/2006 | Tseng | H04N 21/84 715/810 |

(Continued)

FOREIGN PATENT DOCUMENTS

| | | |
|---|---|---|
| CN | 105979310 A | 9/2016 |
| CN | 108174027 A | 6/2018 |
| JP | 2018-026658 A | 2/2018 |

OTHER PUBLICATIONS

The extended European search report issued by the European Patent Office dated Nov. 25, 2019, which corresponds to European Patent Application No. 19185947.9-1209 and is related to U.S. Appl. No. 16/509,106.

*Primary Examiner* — Anh-Vinh Thi Nguyen (74) *Attorney, Agent, or Firm* — Studebaker & Brackett PC (57) ABSTRACT

In a preview image display apparatus, a generating section generates preview images. A panel operation controller displays, on a panel, a main preview screen (first preview screen) displaying the preview images and a sub preview screen (second preview screen) displaying the preview images while the main preview screen (first preview screen) and the sub preview screen (second preview screen) are transferred to each other. A system controller instructs the panel operation controller to display alternate transfer between the main preview screen (first preview screen) and the sub preview screen (second preview screen).

20 Claims, 8 Drawing Sheets

(56) References Cited

U.S. PATENT DOCUMENTS

| | | | | |
|---|---|---|---|---|
| 2008/0231876 | A1* | 9/2008 | Harada | H04N 1/622 358/1.9 |
| 2010/0017731 | A1* | 1/2010 | Taira | G06F 3/038 715/765 |
| 2010/0260506 | A1* | 10/2010 | Naruse | H04N 1/32609 399/9 |
| 2010/0285845 | A1* | 11/2010 | Sawada | H04M 1/0245 455/566 |
| 2010/0289722 | A1* | 11/2010 | Kitazawa | H04W 52/027 345/1.1 |
| 2011/0116055 | A1* | 5/2011 | Nakamura | G03B 21/14 353/82 |
| 2011/0279392 | A1* | 11/2011 | Yamaguchi | G03G 15/502 345/173 |
| 2011/0317193 | A1* | 12/2011 | Iwase | G06F 3/0482 358/1.13 |
| 2012/0050776 | A1* | 3/2012 | Fukumoto | H04N 1/00501 358/1.13 |
| 2012/0050800 | A1* | 3/2012 | Maruyama | H04N 1/00456 358/1.15 |
| 2012/0069221 | A1* | 3/2012 | Imai | H04N 5/232935 348/238 |
| 2012/0072839 | A1* | 3/2012 | Ogino | G06F 3/0488 715/274 |
| 2012/0075650 | A1* | 3/2012 | Tani | H04N 1/00424 358/1.13 |
| 2012/0075670 | A1* | 3/2012 | Yamaguchi | H04N 1/0045 358/1.15 |
| 2012/0079375 | A1 | 3/2012 | Ogino et al. | |
| 2012/0099128 | A1* | 4/2012 | Yoshida | H04N 1/00424 358/1.13 |
| 2012/0099129 | A1* | 4/2012 | Ogino | H04N 1/00448 358/1.13 |
| 2013/0021284 | A1* | 1/2013 | Koda | G06F 1/1624 345/173 |
| 2013/0124998 | A1* | 5/2013 | Pendergast | G11B 27/10 715/723 |
| 2013/0167021 | A1* | 6/2013 | Ishizuka | G06F 40/166 715/256 |
| 2013/0321837 | A1* | 12/2013 | Takai | H04N 1/00413 358/1.13 |
| 2014/0085671 | A1* | 3/2014 | Nakagawa | H04N 1/00384 358/1.15 |
| 2014/0155121 | A1 | 6/2014 | Haba | |
| 2014/0240543 | A1* | 8/2014 | Kim | H04N 5/272 348/231.99 |
| 2014/0285850 | A1* | 9/2014 | Hosono | H04N 1/00469 358/1.18 |
| 2014/0334797 | A1* | 11/2014 | Lee | G06F 16/739 386/241 |
| 2014/0376021 | A1* | 12/2014 | Nishiyama | H04N 1/00442 358/1.13 |
| 2015/0046864 | A1* | 2/2015 | Fujii | G06F 3/04886 715/771 |
| 2015/0172552 | A1* | 6/2015 | Kim | H04N 5/2624 348/333.05 |
| 2015/0277828 | A1 | 10/2015 | Okuda et al. | |
| 2015/0346991 | A1* | 12/2015 | Kwak | G06F 3/0488 715/765 |
| 2016/0057299 | A1* | 2/2016 | Maeda | H04N 1/00453 358/1.15 |
| 2016/0125062 | A1* | 5/2016 | Karlsson | G06F 16/58 707/737 |
| 2016/0313969 | A1* | 10/2016 | Ayabe | G09G 5/12 |
| 2017/0085727 | A1* | 3/2017 | Sasahara | H04N 1/0049 |
| 2017/0132687 | A1* | 5/2017 | Kim | G06Q 30/0625 |
| 2018/0004461 | A1* | 1/2018 | Nakamura | G06F 3/1256 |
| 2018/0048777 | A1 | 2/2018 | Murakami | |
| 2018/0278770 | A1* | 9/2018 | Naitoh | H04N 1/00514 |
| 2018/0284672 | A1* | 10/2018 | Saeda | G06K 15/005 |
| 2019/0129585 | A1* | 5/2019 | Sawano | G06F 3/04817 |
| 2020/0374415 | A1* | 11/2020 | Tagawa | H04N 1/00822 |
| 2021/0243419 | A1* | 8/2021 | Kusafuka | H04N 13/356 |

\* cited by examiner

PREVIEW IMAGE DISPLAY APPARATUS AND STORAGE MEDIUM

INCORPORATION BY REFERENCE

The present application claims priority under 35 U.S.C. § 119 to Japanese Patent Application No. 2018-132275, filed on Jul. 12, 2018. The contents of this application are incorporated herein by reference in their entirety.

BACKGROUND

The present disclosure relates to a preview image display apparatus suitable to editing of a preview image and a storage medium.

Some models of, for example, an image forming apparatus such as a multifunction peripheral (MFP) have a preview function of displaying a preview image based on for example an image of a document read by a scanner or printing data of a printing job.

As an apparatus having such a preview function, an image forming apparatus as follows has been proposed. The image forming apparatus includes a preview image generating section that generates a preview image of each of pages of a previously read document, a user interface processing section that displays, on a preview screen of an operation panel, a next-document adding button by which an additional document may be added to the previously read document while the preview image of the first document is displayed, and a document addition processing section that adds the additional document read through scanning, which starts upon the next-document adding button being pressed, to the previously read document the preview image of which is being displayed.

SUMMARY

A preview image display apparatus according to the present disclosure includes a panel; a generating section, a panel operation controller, and a system controller. The generating section generates preview images. The panel operation controller displays, on the panel, a first preview screen displaying the preview images and a second preview screen displaying the preview images while the first preview screen and the second preview screen are transferred to each other. The system controller instructs the panel operation controller to display alternate transfer between the first preview screen and the second preview screen.

A storage medium according to the present disclosure is a non-transitory computer-readable storage medium storing therein a program to be executed by a computer for controlling a preview image display apparatus. The preview image display apparatus includes a generating section, a panel operation controller, a panel, and a system controller. Through execution of the program, the computer causes:

generation of preview images by the generating section;

display, by the panel operation controller, on the panel, of a first preview screen displaying the preview images and a second preview screen displaying the preview images while the first preview screen and the second preview screen are transferred to each other; and instruction, by a system controller, to the panel operation controller, to display alternate transfer between the first preview screen and the second preview screen.

BRIEF DESCRIPTION OF THE DRAWINGS

FIGS. 2A and 2B illustrate preview screens displayed on a panel of the MFP. FIG. 2B illustrates a sub preview screen.

FIGS. 3A, 3B, and 3C illustrate function switching of the preview screens displayed on the panel of the MFP illustrated in FIG. 1.

FIGS. 4A, 4B, and 4C illustrate the function switching of the preview screens displayed on the panel of the MFP illustrated in FIG. 1.

FIGS. 5A, 5B, and 5C illustrate editing on a preview image on the preview screens displayed on the panel of the MFP illustrated in FIG. 1.

FIGS. 6A, 6B, and 6C illustrate the editing on another preview image on the preview screens displayed on the panel of the MFP illustrated in FIG. 1.

DETAILED DESCRIPTION

Hereinafter, an embodiment of a preview image display apparatus according to the present disclosure will be described with reference to FIGS. 1 to 5C. The preview image display apparatus described below is a multifunction peripheral (MFP), which is a composite peripheral having standard functions such as a printing function, a copying function, a facsimile (FAX) function, and a data transmitting and receiving function via a network.

Figure 1:
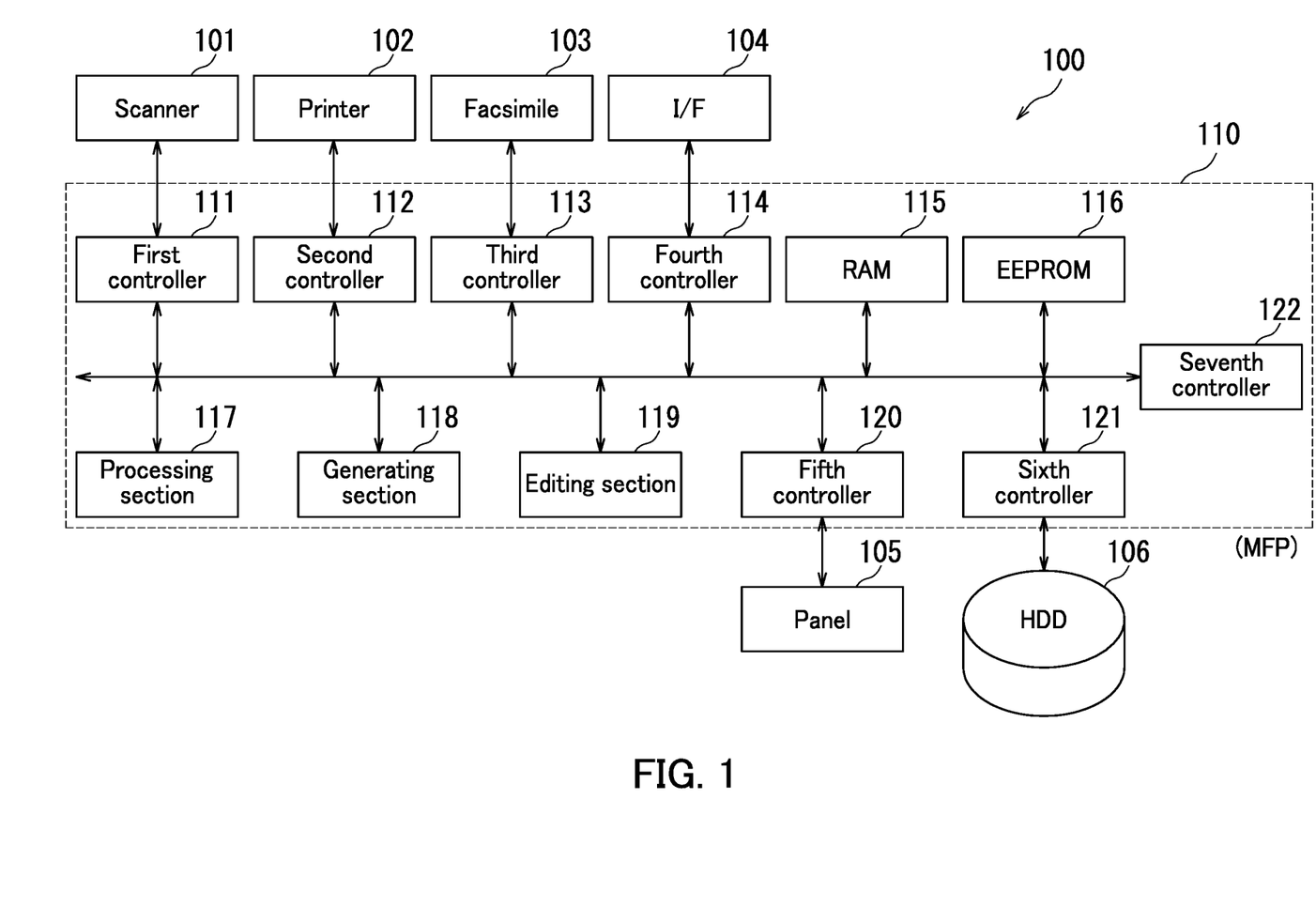
FIG. 1 illustrates an embodiment in which a preview image display apparatus according to the present disclosure is applied to an MFP illustrated in FIG. 1.

As illustrated in FIG. 1, an MFP 100 includes a scanner 101, a printer 102, a Facsimile 103, an interface (I/F) 104, a panel 105, a hard disk drive (HDD) 106, and a controller 110 controlling operations of these components.

The scanner 101 is a device that converts an image of a document (not illustrated) read by an image sensor (not illustrated) into digital image data and inputs the digital image data to the controller 110. The printer 102 is a device that prints an image on a sheet (e.g., paper sheet; not illustrated) based on printing data output from the controller 110. The Facsimile 103 is a device that transmits data output from the controller 110 to a facsimile, which is a device that may perform data transmission/receiving with the Facsimile 103, via a telephone line, or receives data from the facsimile and inputs the received data to the controller 110.

Communication with for example another MFP, a user terminal is performed through the I/F 104 via a network (not illustrated). Communication with a content server (not illustrated), a web server (not illustrated), or the like may be performed through the I/F 104. The panel 105 is a device such as a touch panel that performs display for various setting of the MFP 100 including for example the printing function, the copying function, the FAX functions, and the data transmitting and receiving function via the network. The HDD 106 is a nonvolatile memory device that stores therein for example an application program for providing various functions of the MFP 100. The HDD 106 includes a user box that stores, for example, a printing job registered by a user terminal and image data such as data in a printable format that is written by a page description language.

The controller 110 is a processor that executes an application program including for example an authentication program, a program for image formation, a control program, and the like to control overall operation of the MFP 100. The controller 110 includes a first controller 111 (hereinafter, the first controller 111 may be referred to as a "scanner controller 111"), a second controller 112 (hereinafter, the second controller 112 may be referred to as a "printer controller 112"), a third controller 113 (hereinafter, the third controller 113 may be referred to as a "FAX controller 113"), a fourth controller 114 (hereinafter, the fourth controller 114 may be referred to as a "communication controller 114"), random-access memory (RAM) 115, electrically erasable programmable read-only memory (EEPROM) 116, a processing section 117, a generating section 118, an editing section 119, a fifth controller 120 (hereinafter, the fifth controller 120 may be referred to as "panel operation controller 120"), a sixth controller 121 (hereinafter, the sixth controller 121 may be referred to as an "HDD controller 121"), and a seventh controller 122 (hereinafter, the seventh controller 122 may be referred to as a "system controller 122"). These components are connected with a data bus.

The first controller 111 controls a reading operation of the scanner 101. The second controller 112 controls a printing operation of the printer 102. The third controller 113 controls a data transmitting and receiving operation of the Facsimile 103. The fourth controller 114 controls, through the I/F 104, transmission and receiving of data or the like via a network.

The RAM 115, which is a volatile memory device, is work memory for program execution. The RAM 115 stores therein printing data generated by image processing performed by the processing section 117. The EEPROM 116 stores therein a control program by which, for example, the operation of each component is checked. The EEPROM 116 also stores therein firmware including version data by which for example the scanner 101, the printer 102, the Facsimile 103, and the I/F 104, the panel 105, the HDD 106 are operated.

A non-transitory computer-readable storage medium stores therein a program to be executed by a computer for controlling a preview image display apparatus, the preview image display apparatus including a generating section, a panel operation controller, a panel, and a system controller. The computer causes through execution of the program: generation of preview images by the generating section; display, by the panel operation controller, on the panel, of a first preview screen displaying the preview images and a second preview screen displaying the preview images while the first preview screen and the second preview screen are transferred to each other; and instruction, by a system controller, to the panel operation controller, to display alternate transfer between the first preview screen and the second preview screen.

Figure 2A:
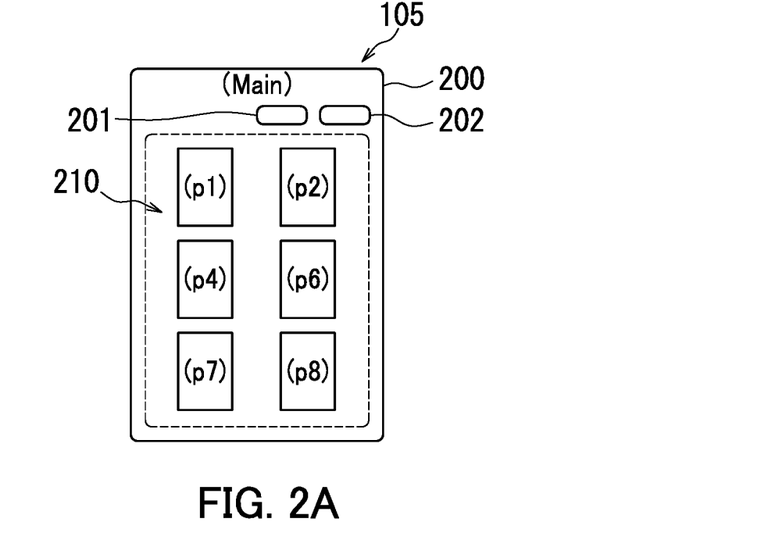
FIG. 2A illustrates a main preview screen.
Figure 2B:
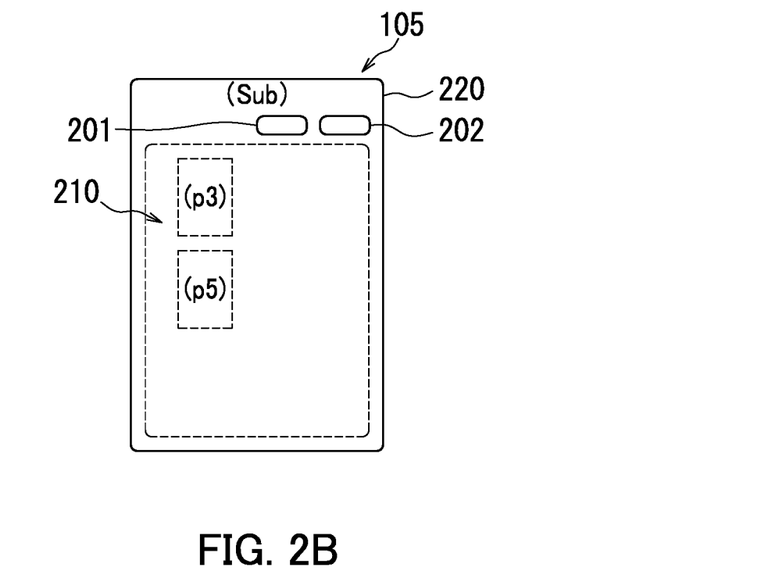

The processing section 117 performs image processing (rasterization) on the image data read by the scanner 101. The processing section 117 also performs image processing (rasterization) on data, as a printing target, registered in the user box of the HDD 106. The system controller 122 causes the RAM 115 to temporarily store the printing data generated by the image processing performed by the processing section 117. The generating section 118 generates preview images 210 as illustrated in FIG. 2A or FIG. 2B referred to below based on, for example, the image of the document read by the scanner 101 or the printing data of the printing job stored on the user box of the HDD 106. The editing section 119 performs page combining of, for example, the preview images 210 moved from a sub preview screen 220 illustrated in FIG. 2B referred to below to a main preview screen 200 illustrated in FIG. 2A referred to below and the preview images 210 displayed on the main preview screen 200. The editing section 119 performs an editing process such as enlargement, size reduction, or copying, deletion of for example the preview images 210 illustrated in FIG. 2A referred to below or the preview images 210 illustrated in FIG. 2B referred to below.

The fifth controller 120 controls a display operation of the panel 105. The fifth controller 120 detects a touch operation on the panel 105. The fifth controller 120 displays either or both the preview images 210 generated by the generating section 118 on the main preview screen 200 in FIG. 2A referred to below and the sub preview screen 220 in FIG. 2B referred to below. The fifth controller 120 moves at least one of the preview images 210 on the main preview screen 200 to the sub preview screen 220 or moves at least one of the preview images 210 on the sub preview screen 220 to the main preview screen 200 in response to a drag operation or the like following the touch operation on the panel 105. The fifth controller 120 displays, for example, an image including the preview image 210 moved from the sub preview screen 220 to the main preview screen 200 and inserted at a position between the preview images 210 displayed on the main preview screen 200. The position is in accordance with the position to which the preview image 210 has been moved. The fifth controller 120 receives, for example, start of printing, copying, FAX transmitting and receiving, data transmitting and receiving via a network via the panel 105.

The seventh controller 122 controls for example an associating operation of the components. When copying, printing or the like is selected through the panel 105, the seventh controller 122 controls document reading by the scanner 101 or printing on the printing medium by the printer 102 through the first controller 111 or the second controller 112. When it is instructed to display preview images 210 through the panel 105, the seventh controller 122 instructs the generating section 118 to generate the preview images 210 as illustrated in FIG. 2A or FIG. 2B referred to below based on, the image of the document read by the scanner 101 or the printing data of the printing job stored on the user box of the HDD 106 or the like. When the generating section 118 generates the preview images 210, the seventh controller 122 instructs the fifth controller 120 to display the preview images 210 generated by the generating section 118 on the panel 105.

Now, the preview images displayed on the panel 105 will be described with reference to FIG. 2 and FIG. 3. FIG. 2A illustrates the main preview screen 200. The main preview screen 200 is a preview screen that is displayed on the panel 105 by the seventh controller 122 through the fifth controller 120 based on, for example, a first instruction to display the preview images 210. Note that the main preview screen 200 may be switched to the sub preview screen 220 as described below.

The main preview screen 200 displays, for example, preview images 210 corresponding to the image of the document read by the scanner 101. The main preview screen 200 also displays an editing button 201 and a function switching button 202. The editing button 201 is selected to perform enlargement, size reduction, copying, deletion or the like of, for example, all the preview images 210 or a selected preview image 210 displayed on the main preview screen 200. In this case, it may be configured such that, for example, when a touch operation is made on the editing button 201, a pop-up screen by which enlargement, size reduction, copying, deletion or the like may be selected is displayed on the main preview screen 200. With such a configuration, the editing section 119 may edit for example the selected preview image 210 easily. The function switching button 202, when being touched, switches functions of the main preview screen 200 to functions of the sub preview screen 220 illustrated in FIG. 2B referred to below. The function switching button 202 will be described below in detail.

FIG. 2A illustrates a state in which the main preview screen 200 displays the preview images 210 of a first page (p1), a second page (p2), a fourth page (p4), a sixth page (p6), a seventh page (p7), and an eighth page (p8) of, for example, the image of the document read by the scanner 101. In other words, FIG. 2A illustrates that the scanner 101 have failed to read a third page (p3) and a fifth page (p5).

FIG. 2B illustrates the sub preview screen 220. The sub preview screen 220 is a preview screen that displays, for example, the preview images 210 of the document read by the scanner 101 while displaying, for example, the main preview screen 200. Note that the sub preview screen 220 may be switched to the main preview screen 200 as described below. The sub preview screen 220 displays, for example, the preview images 210 of the image of the document read by the scanner 101. The sub preview screen 220 also displays the editing button 201 and the function switching button 202 like the main preview screen 200. The editing button 201 is selected to perform enlargement, size reduction, copying, deletion or the like of, for example, all the preview images 210 or a selected preview image 210 displayed on the sub preview screen 220. In this case, as described above regarding the main preview screen 200, it may be configured such that, for example, when a touch operation is made on the editing button 201, a pop-up screen by which enlargement, size reduction, copying, deletion or the like may be selected is displayed on the sub preview screen 220. With such a configuration the editing section 119 may edit, for example, the selected preview image 210 easily. As described above regarding the main preview screen 200, the function switching button 202, when being touched, switches the functions of the sub preview screen 220 to the functions of the main preview screen 200 illustrated in FIG. 2A. FIG. 2B illustrates a state in which the sub preview screen 220 displays, for example, the preview images 210 of the third page (p3) and the fifth page (p5) of the image of the document read by the scanner 101.

Now, with reference to FIG. 3, the function switching performed by use of the function switching button 202 described above will be described. FIG. 3A illustrates the main preview screen 200 before the function switching. When a touch operation is made on the function switching button 202 on the main preview screen 200, the main preview screen 200 in FIG. 3A is switched to the sub preview screen 220 as illustrated in FIG. 3B. At this point, the sub preview screen 220 illustrated in FIG. 2B is switched to the main preview screen 200 as illustrated in FIG. 3C. Note that the switching of the main preview screen 200 to the sub preview screen 220 and the switching of the sub preview screen 220 to the main preview screen 200 are switching of the functions as described above. In other words, the switching of the main preview screen 200 to the sub preview screen 220 is that the screen that has been acting as the main preview screen 200 now acts as the sub preview screen 220. The switching of the sub preview screen 220 to the main preview screen 200 is that the screen that has been acting as the sub preview screen 220 now acts as the main preview screen 200.

That is, the switching of, for example, the functions of the main preview screen 200 is to stop the functions of performing, with priority, for example printing or edited content storing on the preview images 210 without changing the contents of the preview images 210 displayed on the main preview screen 200 (sub preview screen 220 after the function switching). This will be described in more detail. The main preview screen 200 illustrated in FIG. 3A has functions of performing printing, edited content storing, and the like on the displayed preview images 210 that are performed with priority. By contrast, the sub preview screen 220 illustrated in FIG. 2B merely has assisting functions to the main preview screen 200. An example of the assisting functions of the sub preview screen 220 is a function by which the preview image 210 to be moved to the main preview screen 200 is once displayed and the data on such a preview image 210 displayed on the sub preview screen 220 is erased once the sub preview screen 220 is closed.

Figure 3A:
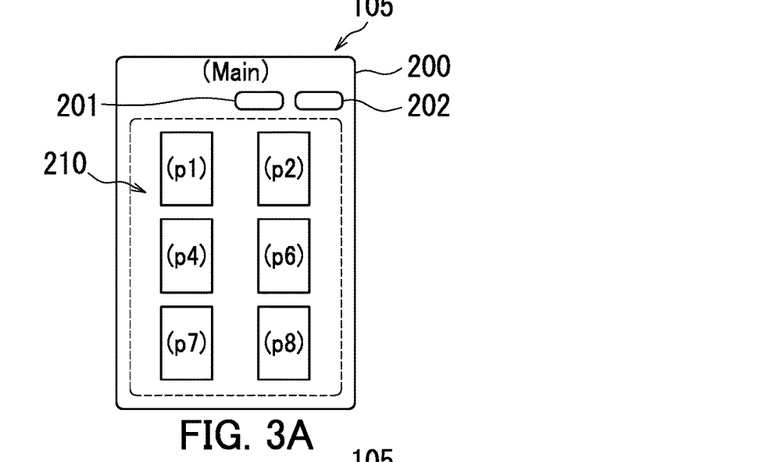
FIG. 3A illustrates the main preview screen before the function switching.
Figure 3B:
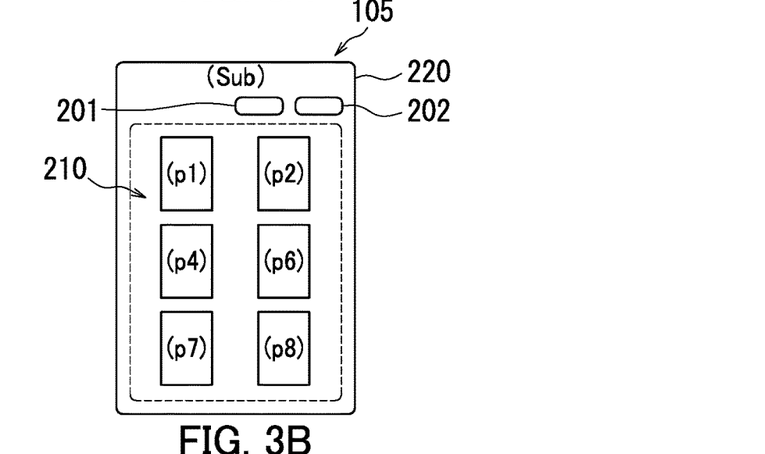
FIG. 3B illustrates the sub preview screen after the function switching from the main preview screen.
Figure 3C:
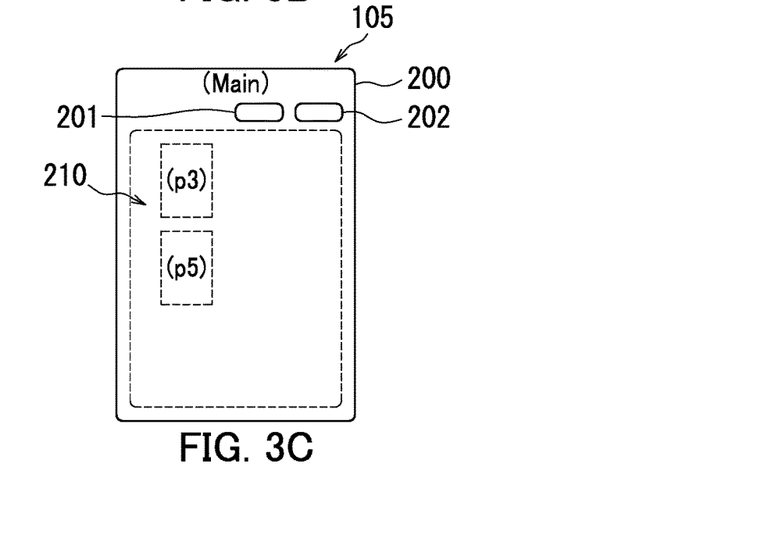
FIG. 3C illustrates the main preview screen after the function switching from the sub preview screen.

Therefore, the main preview screen 200 illustrated in FIG. 3A, when being switched to the sub preview screen 220 illustrated in FIG. 3B, loses the prioritized functions of performing printing, edited content storing, and the like on the preview images 210. By contrast, the sub preview screen 220 illustrated in FIG. 2B, when switched to the main preview screen 200 illustrated in FIG. 3C, is provided with the functions of performing, with priority, printing, edited content storing, and the like on the preview images 210 without changing the contents of the preview images 210 displayed on the sub preview screen 220 (main preview screen 200 after the function switching).

Figure 4A:
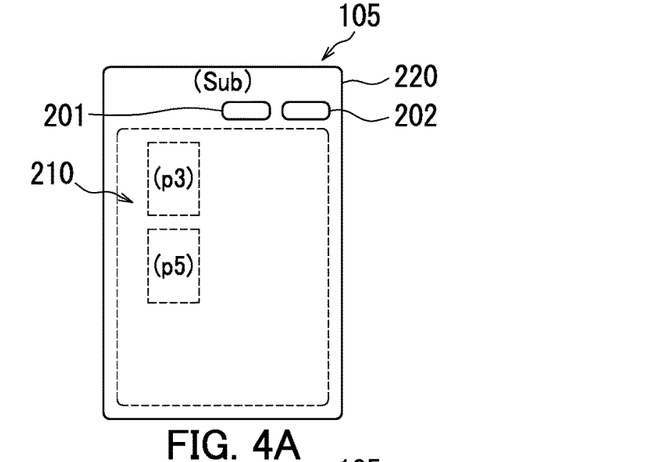
FIG. 4A illustrates the sub preview screen before the function switching.
Figure 4B:
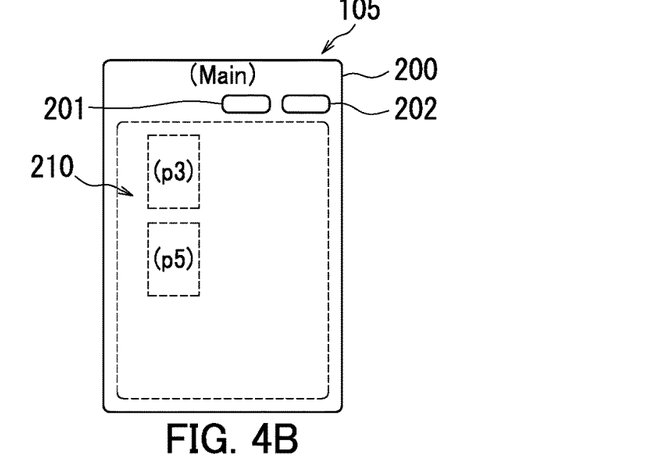
FIG. 4B illustrates the main preview screen after the function switching from the sub preview screen.
Figure 4C:
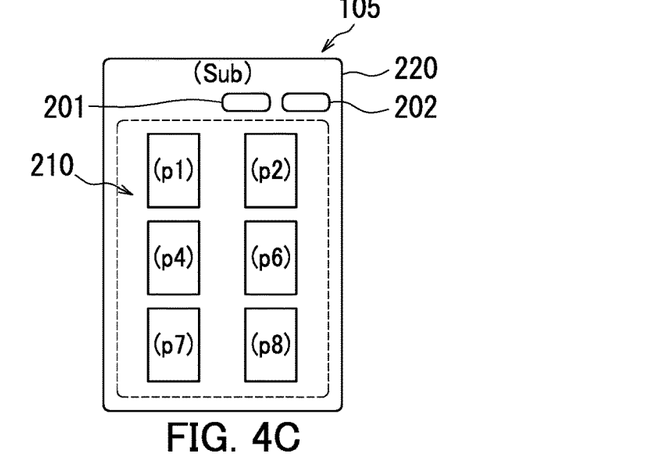
FIG. 4C illustrates the sub preview screen after the function switching from the main preview screen.

Now, FIG. 4A will be referred to. When a touch operation is made on the function switching button 202 on the sub preview screen 220 in FIG. 4A, the sub preview screen 220 in FIG. 4A is switched to the main preview screen 200 as illustrated in FIG. 4B. At this point, the main preview screen 200 in FIG. 3A is switched to the sub preview screen 220 as illustrated in FIG. 4C.

As described above, a touch operation made on the function switching button 202 on the main preview screen 200 or the sub preview screen 220 may switch the functions of the respective preview screen. Even though there are two preview screens, the process such as printing or edited content storing on the preview images 210 displayed on the respective preview screen may be performed easily.

Figure 5A:
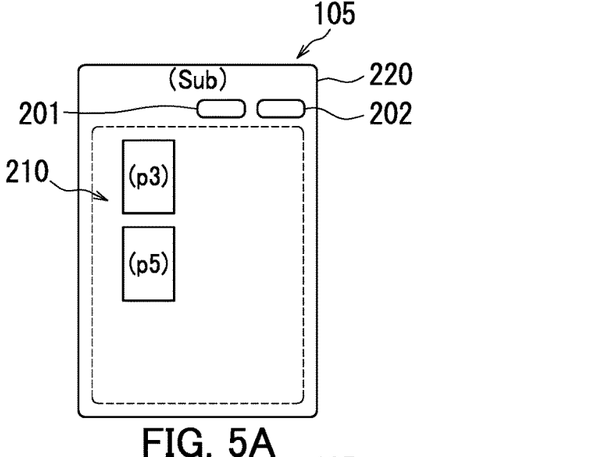
FIG. 5A illustrates the sub preview screen before the preview image is moved.

Now, with reference to FIG. 5 and FIG. 6, an overview of editing such as moving of preview images 210 will be described. FIG. 5A illustrates the sub preview screen 220 before the preview images 210 are moved. As described above, the sub preview screen 220 is a preview screen that displays, for example, the preview images 210 of the document scanned by the scanner 101 while, for example, the main preview screen 200 is displayed. The sub preview screen 220 displays the preview images 210 of the third page (p3) and the fifth page (p5). The displayed preview images 210 of the third page (p3) and the fifth page (p5) are the preview images 210 that the scanner 101 had failed to read during the first scanning and has read by re-reading.

Now, it is assumed that the preview image 210 of the third page (p3) is to be moved to the main preview screen 200. In this case, the panel 105 displays only the sub preview screen 220. Therefore, the preview image 210 of the third page (p3) is touched and dragged, for example, rightward while being touched. The fifth controller 120, upon detecting that the preview image 210 has been dragged rightward, transfers the display on the panel 105 from the sub preview screen 220 to the main preview screen 200 as illustrated in FIG. 5B in response to an instruction from the seventh controller 122. In this example, the preview image 210 is dragged rightward to transfer the sub preview screen 220 to the main preview screen 200. The present disclosure is not limited to this. For example, the preview image 210 may be dragged leftward to transfer the sub preview screen 220 to the main preview screen 200. The "transfer of the screen" is different from the function switching described above, and indicates that the display of the sub preview screen 220 (or the main preview screen 200) is erased and the main preview screen 200 (or the sub preview screen 220) is displayed.

Figure 5B:
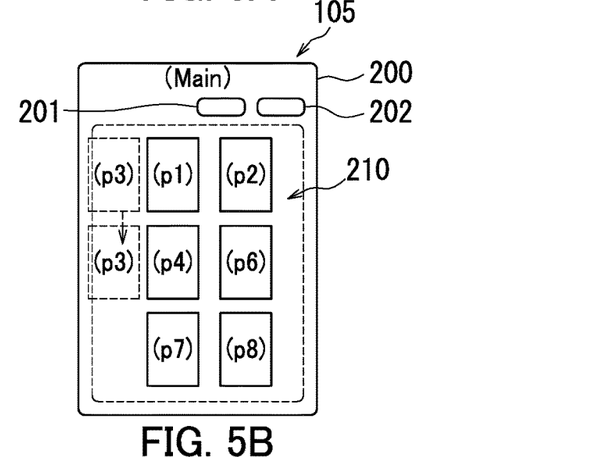
FIG. 5B illustrates a state in which the preview image has been moved from the sub preview screen to the main preview screen.

On the main preview screen 200 illustrated in FIG. 5B, the preview image 210 of the third page (p3) is moved to a position adjacent to, and to the left of, the preview image 210 of the first page (p1), moved to a position adjacent to, and to the left of, the preview image 210 of the fourth page (p4), and then dropped. At this point, the fifth controller 120 changes the display of the main preview screen 200 such that as illustrated in FIG. 5C, the preview image 210 of the third page (p3) moved from the sub preview screen 220 is inserted at a position between the preview image 210 of the second page (p2) and the preview image 210 of the fourth page (p4).

Figure 5C:
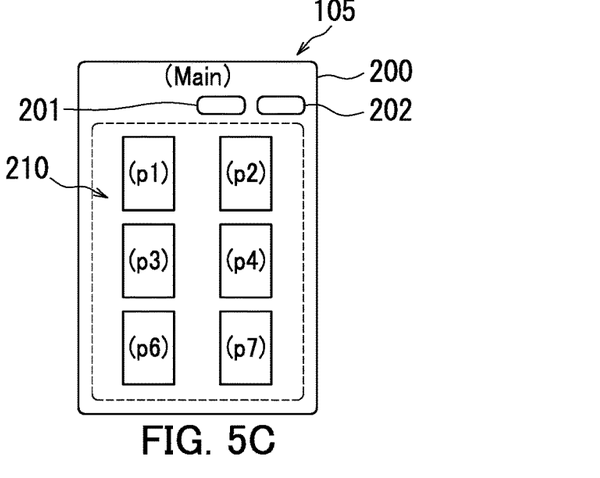
FIG. 5C illustrates a state in which the preview image has been inserted into the main preview screen.
Figure 6A:
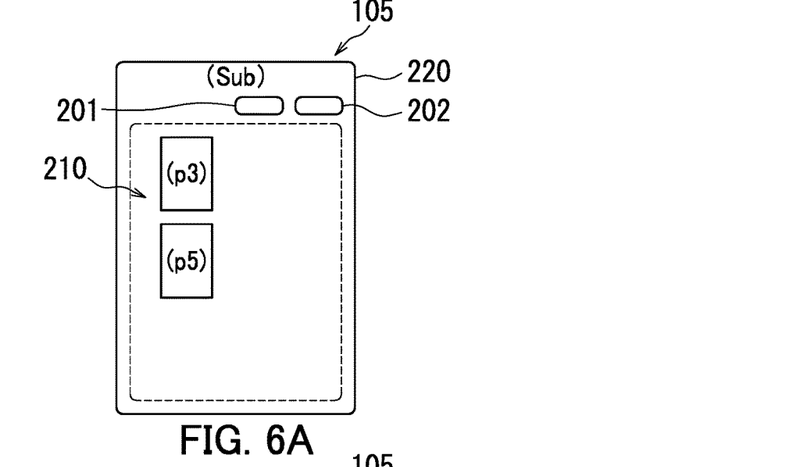
FIG. 6A illustrates the sub preview screen before the preview image is moved.

The preview screen 200 illustrated in FIG. 5C is swiped back to the sub preview screen 220 illustrated in FIG. 6A, and it is assumed that, for example, the preview image 210 of the fifth page (p5) is to be moved to the main preview screen 200. In this case, the panel 105 displays only the sub preview screen 220 as described above. Therefore, the preview image 210 of the fifth page (p5) is touched and dragged, for example, rightward while being touched. The fifth controller 120, upon detecting that the preview image 210 has been dragged rightward, transfers the display on the panel 105 from the sub preview screen 220 to the main preview screen 200 as illustrated in FIG. 6B in substantially the same manner as described above in response to an instruction from the seventh controller 122. In this example, the preview image 210 is dragged rightward to transfer the sub preview screen 220 to the main preview screen 200. The present disclosure is not limited to this. For example, the preview image 210 may be dragged leftward to transfer the sub preview screen 220 to the main preview screen 200.

Figure 6B:
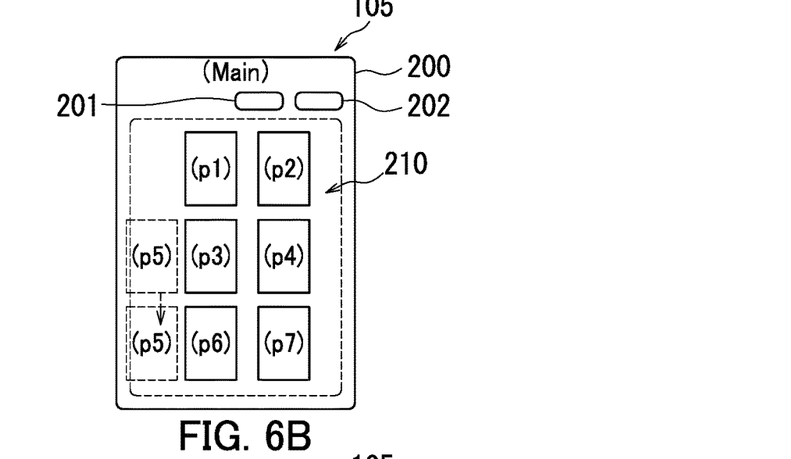
FIG. 6B illustrates a state in which the preview image has been moved from the sub preview screen to the main preview screen.

On the main preview screen 200 illustrated in FIG. 6B, the preview image 210 of the fifth page (p5) is moved to a position adjacent to, and to the left of, the preview image 210 of the third page (p3), moved to a position adjacent to, and to the left of, the preview image 210 of the sixth page (p6), and then dropped. At this point, the fifth controller 120 changes the display of the main preview screen 200 such that as illustrated in FIG. 6C, the preview image 210 of the fifth page (p5) moved from the sub preview screen 220 is inserted at a position between the preview image 210 of the fourth page (p4) and the preview image 210 of the sixth page (p6).

Now, with reference to FIG. 7 and FIG. 8, the editing process that the MFP 100 performs on the preview image 210 will be described. In the following, a case where the preview image 210 is edited based on the image of the document read by the scanner 101 will be described.
(Step S101)

Figure 7:
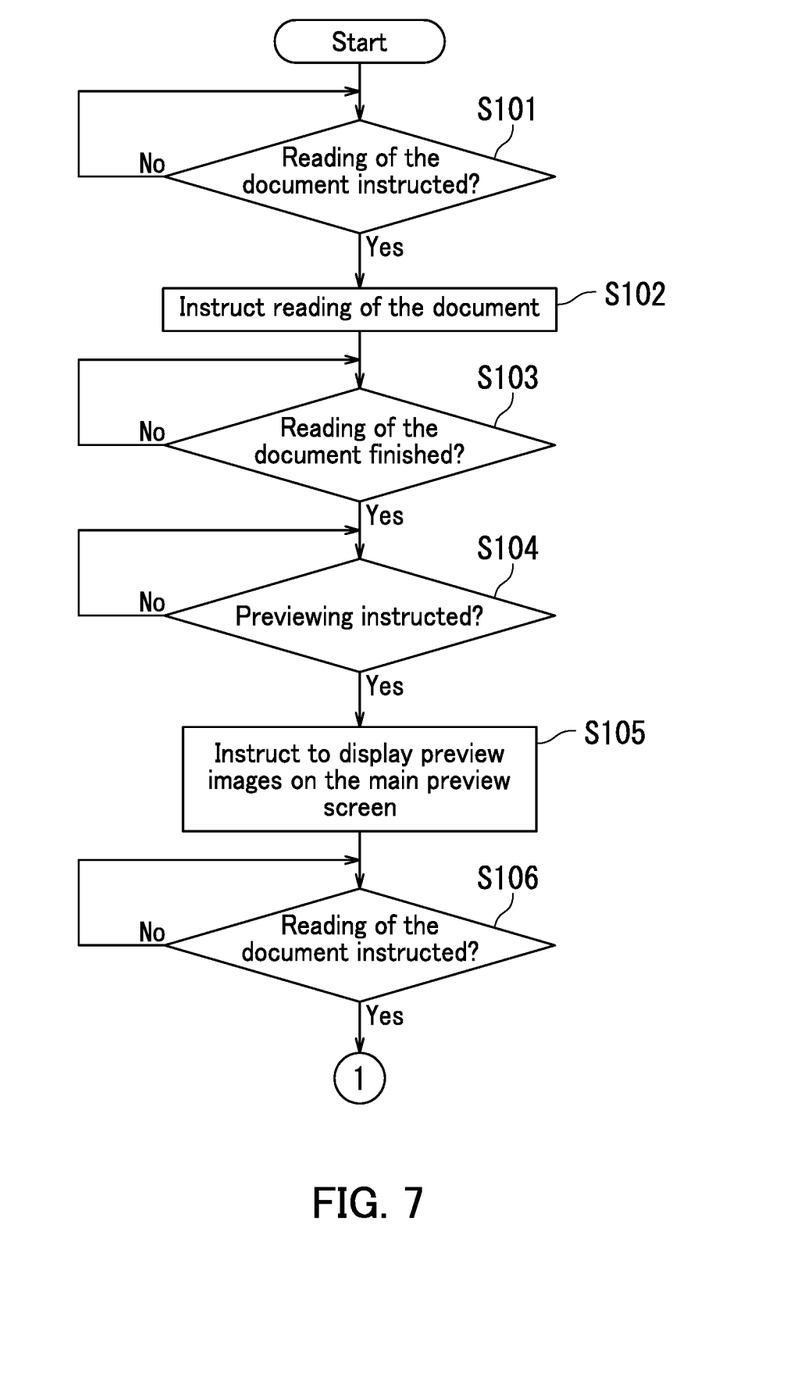
FIG. 7 is a part of a flowchart illustrating an editing process performed on a preview image by the MFP illustrated in FIG. 1.
Figure 8:
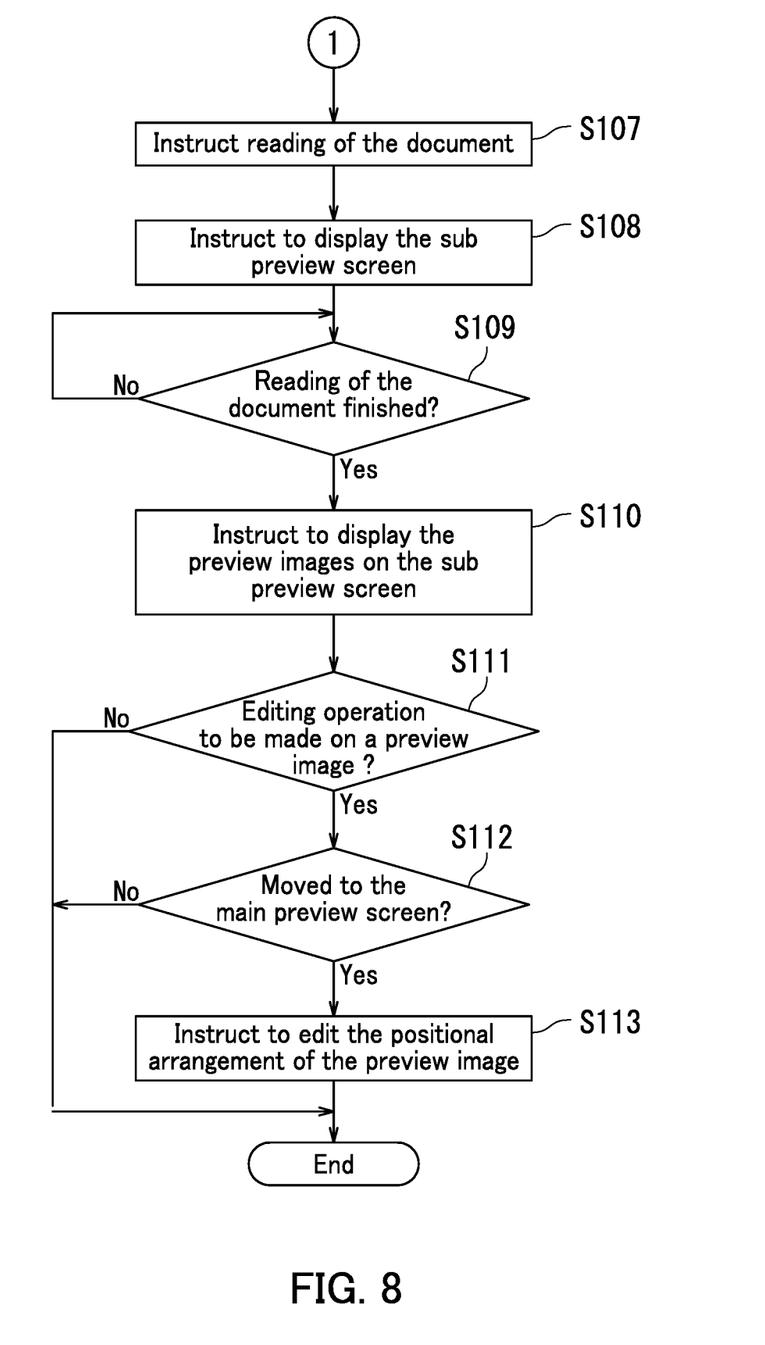
FIG. 8 is another part of the flowchart illustrating the editing process performed on the preview image by the MFP illustrated in FIG. 1.

As illustrated in FIG. 7, the seventh controller 122 determines whether or not reading of the document has been instructed.

In this case, unless it is notified by the fifth controller 120 that an instruction to read the document has been received through the panel 105, the seventh controller 122 determines that the reading of the document has not been instructed (Step S101: No).

By contrast, when it is notified by the fifth controller 120 that an instruction to read the document has been received through the panel 105, the seventh controller 122 determines that the reading of the document has been instructed (Step S101: Yes), and the routine proceeds to Step S102.
(Step S102)

The seventh controller 122 instructs the first controller 111 to read the document.

At this point, the first controller 111 controls the scanner 101 to read the document.

The seventh controller 122 causes the RAM 115 to store an image of the document read by the scanner 101.
(Step S103)

The seventh controller 122 determines whether or not the reading of the document has been finished.

In this case, unless it is notified by the first controller 111 that the reading of the document by the scanner 101 has been finished, the seventh controller 122 determines that the reading of the document has not been finished (Step S103: No).

By contrast, when it is notified by the first controller 111 that the reading of the document by the scanner 101 has been finished, the seventh controller 122 determines that the reading of the document has been finished (Step S103: Yes), and the routine proceeds to Step S104.
(Step S104)

The seventh controller 122 determines whether or not previewing has been instructed.

In this case, unless it is notified by the fifth controller 120 that an instruction to preview has been received through the panel 105, the seventh controller 122 determines that the previewing has not been instructed (Step S104: No).

By contrast, when it is notified by the fifth controller 120 that an instruction to preview has been received through the panel 105, the seventh controller 122 determines that the previewing has been instructed (Step S104: Yes), and the routine proceeds to Step S105.
(Step S105)

The seventh controller 122 instructs display of the preview images 210 on the main preview screen 200.

In this case, the seventh controller 122 instructs the generating section 118 to generate a preview image 210 of the image of the document read by the scanner 101.

The seventh controller 122 instructs the fifth controller 120 to display the preview image 210 generated by the generating section 118.
(Step S106)

The seventh controller 122 determines whether or not the reading of the document has been instructed.

In this case, unless it is notified by the fifth controller 120 that an instruction to read the document has been received through the panel 105, the seventh controller 122 determines that the reading of the document has not been instructed (Step S106: No).

By contrast, when it is notified by the fifth controller 120 that an instruction to read the document has been received through the panel 105, the seventh controller 122 determines that the reading of the document has been instructed (Step S106: Yes), and the routine proceeds to Step S107 illustrated in FIG. 8.

(Step S107)

The seventh controller 122 instructs the first controller 111 to read the document.

At this point, the first controller 111 controls the scanner 101 to read the document.

The seventh controller 122 causes the RAM 115 to store an image of the document read by the scanner 101.

(Step S108)

The seventh controller 122 instructs the fifth controller 120 to display the sub preview screen 220.

At this point, the fifth controller 120 transfers the main preview screen 200 displayed on the panel 105 to the sub preview screen 220 and displays the sub preview screen 220.

The reading of the document to be displayed on the sub preview screen 220 has not been finished. Therefore, the sub preview screen 220 does not display any preview image 210.

(Step S109)

The seventh controller 122 determines whether or not the reading of the document has been finished.

In this case, unless it is notified by the first controller 111 that the reading of the document by the scanner 101 has been finished, the seventh controller 122 determines that the reading of the document has not been finished (Step S109: No).

By contrast, when it is notified by the first controller 111 that the reading of the document by the scanner 101 has been finished, the seventh controller 122 determines that the reading of the document has been finished (Step S109: Yes), and the routine proceeds to Step S110.

(Step S110)

The seventh controller 122 instructs the fifth controller 120 to display the preview image 210 on the sub preview screen 220. In this case, the seventh controller 122 instructs the generating section 118 to generate a preview image 210 of an image of the document read by the scanner 101.

The seventh controller 122 instructs the fifth controller 120 to display the preview image 210 generated by the generating section 118.

(Step S111)

The seventh controller 122 determines whether or not there is an editing operation to be received on the preview image 210.

In this case, unless it is notified by the fifth controller 120 that the preview image 210 has been moved on the sub preview screen 220 or that a touch operation on the editing button 201 on the sub preview screen 220 has been received through the panel 105, the seventh controller 122 determines that there is no editing operation to be performed on the preview image 210 (Step S111: No), and finishes the process.

One case where there is no editing operation to be performed on the preview image 210 may be a case where the sub preview screen 220 is closed with no process being made thereon.

By contrast, when it is notified by the fifth controller 120 via the panel 105 that the preview image 210 on the sub preview screen 220 has been moved or that a touch operation on the editing button 201 has been detected, the seventh controller 122 determines that there is an editing operation to be performed on the preview image 210 (Step S111: Yes), and goes to Step S112.

(Step S112)

The seventh controller 122 determines whether or not the preview image 210 has been moved to the main preview screen 200.

In this case, when a touch operation has been made on the function switching button 202 as described above with reference to, for example, FIG. 4A and the fifth controller 120 has switched the sub preview screen 220 to the main preview screen 200 as illustrated in FIG. 4B, the seventh controller 122 determines that the preview image 210 has not been moved to the main preview screen 200 (Step S112: No).

By contrast, when it is notified by the fifth controller 120 that the preview image 210 of the third page (p3) has been touched and dragged, for example, rightward while being touched as described above with reference to, for example, FIG. 5A, the seventh controller 122 determines that the preview image 210 has been moved to the main preview screen 200 (Step S112: Yes), and the routine proceeds to Step S113.

(Step S113)

The seventh controller 122 instructs the fifth controller 120 to edit the positional arrangement of the preview image 210.

In this case, it is assumed that, for example, on the main preview screen 200 illustrated in FIG. 5B, the preview image 210 of the third page (p3) has been moved to a position adjacent to, and to the left of, the preview image 210 of the first page (p1), further moved to a position adjacent to, and to the left of, the preview image 210 of the fourth page (p4), and dropped.

At this point, the fifth controller 120 changes the display of the main preview screen 200 such that as illustrated in FIG. 5C, the preview image 210 of the third page (p3) moved from the sub preview screen 220 is inserted at a position between the preview image 210 of the second page (p2) and the preview image 210 of the fourth page (p4).

The main preview screen 200 illustrated in FIG. 5C has been swiped back to the sub preview screen 220 illustrated in FIG. 6A, and it is assumed that the preview image 210 of the fifth page (p5) has been moved to the main preview screen 200.

It is further assumed that, for example, on the main preview screen 200 illustrated in FIG. 5C, the preview image 210 of the fifth page (p5) has been moved a position adjacent to, and to the left of, the preview image 210 of the third page (p3), further moved to a position adjacent to, and to the left of, the preview image 210 of the sixth page (p6), and dropped.

Figure 6C:
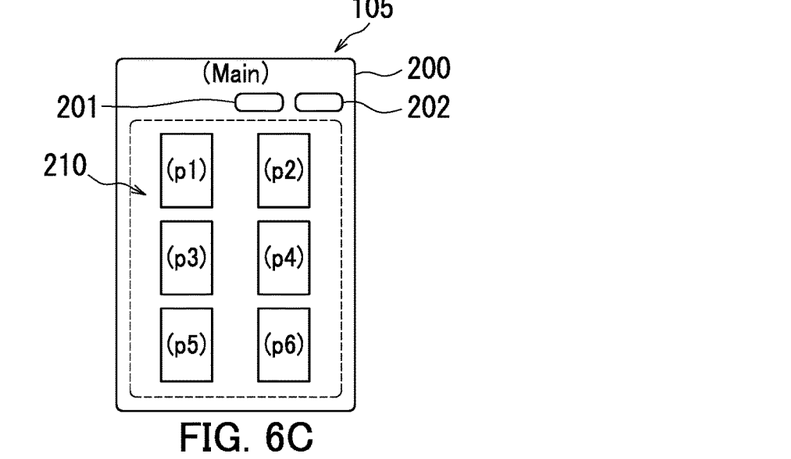
FIG. 6C illustrates a state in which the preview image has been inserted into the main preview screen.

In this case, the fifth controller 120 changes the display of the main preview screen 200 such that as illustrated in FIG. 6C, the preview image 210 of the fifth page (p5) moved from the sub preview screen 220 is inserted at a position between the preview image 210 of the fourth page (p4) and the preview image 210 of the sixth page (p6).

As described above, in this embodiment, the generating section 118 generates the preview images 210. The fifth controller 120 alternately displays, on the panel 105, the main preview screen 200 (first preview screen) displaying the preview images 210 and the sub preview screen 220 (second preview screen) displaying the preview images 210 through transfer between the main preview screen 200 and the sub preview screen 220. Further, the seventh controller 122 instructs the fifth controller 120 to display alternate transfer between the main preview screen 200 (first preview screen) and the sub preview screen 220 (second preview screen).

With the above-described operation, even in the case where there are many preview images 210, each of the preview images 210 is displayed on the main preview screen 200 (first preview screen) or the sub preview screen 220 (second preview screen). This reduces the need to reduce the size of the preview images 210. This makes it easy to confirm the contents of the preview images 210. Therefore, various editing operations on the preview images 210 may be performed adequately.

The preview images 210 are displayed on the main preview screen 200 and the sub preview screen 220, and at least one of the preview images 210 on the sub preview screen 220 is moved to the main preview screen 200. This allows a preview image 210 to be added to the main preview screen 200. This makes it easy to edit and add the preview image 210 to the main preview screen 200.

For example, at least one of the preview image 210 on the main preview screen 200 is moved to the sub preview screen 220. This makes it easy to delete the preview image 210 from the main preview screen 200. In this case, the deleted preview image 210 may be moved from the sub preview screen 220 and thus is returned to the main preview screen 200. This makes it unnecessary to, for example, re-generate the deleted preview image 210 by the generating section 118.

The main preview screen 200 and the sub preview screen 220 each include the function switching button 202. Therefore, a change may be made on the function of performing printing, edited content storing, and the like on the preview images 210 with priority without changing the contents of the displayed preview images 210.

What is claimed is:

1. A preview image display apparatus, comprising:
   a panel;
   a scanner:
   a generating section configured to generate first preview images and second preview images, the first preview images being generated through reading a first document having a plurality of pages by the scanner, the second preview images being generated through reading a second document having only a plurality of pages that differ from the pages of the first document by the scanner;
   a panel operation controller configured to display, on the panel, one of a first preview screen displaying the first preview images and a second preview screen displaying the second preview images while the first preview screen and the second preview screen are alternately transferred to the second preview screen and the first preview screen, respectively; and
   a system controller configured to instruct the panel operation controller to display alternate transfer between the first preview screen and the second preview screen.

2. The preview image display apparatus according to claim 1, wherein
   upon detection by the panel operation controller that one of the second preview images has been moved by a touch operation on the second preview screen, the system controller instructs the panel operation controller to transfer display on the panel from the second preview screen to the first preview screen, and
   the panel operation controller moves the one of the second preview images which is being touch-operated to the first preview screen and inserts the one of the second preview images at a position between the first preview images displayed on the first preview screen in accordance with the position to which the one of the second preview images has been moved.

3. The preview image display apparatus according to claim 1, further comprising
   an editing section configured to perform an editing process on the second preview images or at least one of the first preview images, wherein
   the system controller instructs the editing section to perform the editing process based on an instruction to edit at least one of the first preview images on the first preview screen or the second preview images on the second preview screen.

4. The preview image display apparatus according to claim 1, wherein
   the system controller performs, based on a specific operation on the panel, function switching from the second preview screen to the first preview screen and function switching from the first preview screen to the second preview screen.

5. The preview image display apparatus according to claim 4, wherein
   the function switching from the second preview screen to the first preview screen is that a screen that has been acting as the second preview screen acts as the first preview screen, and
   the function switching from the first preview screen to the second preview screen is that a screen that has been acting as the first preview screen acts as the second preview screen.

6. The preview image display apparatus according to claim 4, wherein
   the first preview screen has a function of performing with priority a process on the first preview images, and
   the function switching from the first preview screen to the second preview screen is to stop the function of performing with priority the process on the first preview images that are being displayed on the first preview screen and that are to be displayed on the second preview screen after the function switching.

7. The preview image display apparatus according to claim 6, wherein
   the function switching from the second preview screen to the first preview screen is to provide a function of performing with priority a process on the second preview images that is being displayed on the second preview screen and that is to be displayed on the first preview screen after the function switching.

8. The preview image display apparatus according to claim 1, wherein
   when the panel operation controller displays the second preview images, the panel operation controller erases the first preview images, and
   when the panel operation controller displays one of the first preview images, the panel operation controller erases a remainder of the first preview images and the second preview images.

9. The preview image display apparatus according to claim 1, wherein
   the system controller is configured to instruct the panel operation controller to display transfer of the second preview screen to the first preview screen upon detecting that one of the second preview images has been dragged and instruct the panel operation controller to display transfer of the first preview screen to the second preview screen upon detecting that one of the first preview images has been dragged.

10. The preview image display apparatus according to claim 1, wherein
upon a button displayed in the panel being touched, the panel is changed to display the first preview screen displaying the second preview images when the second preview screen displaying the second preview images is displayed and to display the second preview screen displaying the first preview images when the first preview screen displaying the first preview images is displayed.

11. The preview image display apparatus according to claim 1, wherein
the panel operation controller alternately displays, on the panel, the first preview screen and the second preview screen without simultaneously displaying the first preview screen and the second preview screen.

12. A non-transitory computer-readable storage medium storing therein a program to be executed by a computer for controlling a preview image display apparatus, the preview image display apparatus including a generating section, a panel operation controller, a panel, and a system controller, the computer causing, through execution of the program:
generation of first preview images and second preview images by the generating section, the first preview images being generated through reading a first document having a plurality of pages by a scanner, the second preview images being generated through reading a second document having only a plurality of pages that differ from the pages of the first document by the scanner;
display, by the panel operation controller, on the panel, of one of a first preview screen displaying the first preview images and a second preview screen displaying the second preview images while the first preview screen and the second preview screen are alternatively transferred to the second preview screen and the first preview screen, respectively; and
instruction, by a system controller, to the panel operation controller, to display alternate transfer between the first preview screen and the second preview screen.

13. The non-transitory computer-readable storage medium according to claim 12, wherein
the computer further causes performance, by the system controller, of function switching from the second preview screen to the first preview screen and function switching from the first preview screen to the second preview screen based on a specific operation on the panel.

14. The non-transitory computer-readable storage medium according to claim 13, wherein
the function switching from the second preview screen to the first preview screen is that a screen that has been acting as the second preview screen acts as the first preview screen, and
the function switching from the first preview screen to the second preview screen is that a screen that has been acting as the first preview screen act as the second preview screen.

15. The non-transitory computer-readable storage medium according to claim 13, wherein
the first preview screen has a function of performing with priority a process on the first preview images, and
the function switching from the first preview screen to the second preview screen is to stop the function of performing with priority the process on the first preview images that is being displayed on the first preview screen and that is to be displayed on the second preview screen after the function switching.

16. The non-transitory computer-readable storage medium according to claim 15, wherein
the function switching from the second preview screen to the first preview screen is to provide a function of performing with priority a process on the second preview images that is being displayed on the second preview screen and that is to be displayed on the first preview screen after the function switching.

17. The non-transitory computer-readable storage medium according to claim 12, wherein
the computer further causes:
when the panel operation controller displays the second preview images, erasure of the first preview images by the panel operation controller, and
when the panel operation controller displays one of the first preview images, erasure a remainder of the first preview images and the second preview images by the panel operation controller.

18. The non-transitory computer-readable storage medium according to claim 12, wherein
the computer further causes:
instruction, by the system controller, to the panel operation controller, to display transfer of the second preview screen to the first preview screen upon detecting that one of the second preview images has been dragged, and
instruction, by the panel operation controller, to display transfer of the first preview screen to the second preview screen upon detecting that one of the first preview images has been dragged.

19. The non-transitory computer-readable storage medium according to claim 12, wherein
the computer further causes
instruction, by the system controller, to the panel operation controller, upon a button displayed in the panel being touched, to display the first preview screen displaying the second preview images when the second preview screen displaying the second preview images is displayed and to display the second preview screen displaying the first preview images when the first preview screen displaying the first preview images is displayed.

20. The non-transitory computer-readable storage medium according to claim 12, wherein
the computer further causes instruction, by the system controller, to the panel operation controller, to display one of the first preview screen and the second preview screen without simultaneously displaying the first preview screen and the second preview screen.

* * * * *